United States Patent
Hoversten et al.

(10) Patent No.: US 9,377,552 B2
(45) Date of Patent: Jun. 28, 2016

(54) SYSTEM AND METHOD FOR DETECTING A FRACTURE IN A ROCK FORMATION USING AN ELECTROMAGNETIC SOURCE

(71) Applicants: Gary Michael Hoversten, Lafayette, CA (US); David Lee Alumbaugh, Berkeley, CA (US)

(72) Inventors: Gary Michael Hoversten, Lafayette, CA (US); David Lee Alumbaugh, Berkeley, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 211 days.

(21) Appl. No.: 13/781,082

(22) Filed: Feb. 28, 2013

(65) Prior Publication Data

US 2014/0239956 A1     Aug. 28, 2014

(51) Int. Cl.
*G01V 3/08* (2006.01)
*G01V 3/12* (2006.01)
G01V 3/38 (2006.01)

(52) U.S. Cl.
CPC *G01V 3/083* (2013.01); *G01V 3/12* (2013.01); G01V 3/38 (2013.01)

(58) Field of Classification Search
CPC ........... G01V 3/083; G01V 3/28; G01V 3/12; G01V 3/30; G01V 1/36; G01V 1/38; G01V 1/48; G01V 9/02
USPC .................. 324/326–327, 330–343, 355–371
See application file for complete search history.

(56) References Cited

U.S. PATENT DOCUMENTS

| 2,805,727 | A | * | 9/1957 | Bazhaw | G01V 1/42 324/323 |
| 5,041,792 | A | * | 8/1991 | Thompson | G01V 3/082 324/350 |
| 5,486,764 | A | * | 1/1996 | Thompson | G01V 3/265 324/323 |
| 5,825,188 | A | | 10/1998 | Montgomery et al. | |
| 6,188,221 | B1 | * | 2/2001 | Van de Kop | G01V 3/12 324/334 |
| 6,393,363 | B1 | * | 5/2002 | Wilt et al. | 702/6 |
| 8,060,309 | B2 | * | 11/2011 | Xue et al. | 702/7 |
| 8,478,533 | B2 | * | 7/2013 | Thompson | G01V 11/007 324/323 |
| 8,589,079 | B2 | * | 11/2013 | Thompson | G01V 11/007 324/323 |
| 8,826,982 | B2 | * | 9/2014 | Tambini | G01V 3/30 166/250.01 |
| 2003/0050759 | A1 | * | 3/2003 | Srnka | G01V 3/083 702/7 |

(Continued)

OTHER PUBLICATIONS

PCT International Search Report and Written Opinion, International Application No. PCT/US2013/069991, dated May 20, 2014.

*Primary Examiner* — Tung X Nguyen
*Assistant Examiner* — Thang Le
(74) *Attorney, Agent, or Firm* — Kamal Goudjil; Marie L. Clapp

(57) ABSTRACT

A surface electromagnetic survey system and method for detecting a fracture or fracture zone in a rock formation are provided. The system includes an electromagnetic source configured to generate an electromagnetic field in the vicinity of or at a surface of the rock formation. The electromagnetic source includes one or more electric dipole sources that are arranged so as to generate a substantially vertical electric field. The system also includes an electromagnetic receiver associated with the electromagnetic source, the electromagnetic receiver being configured to measure a component of the electromagnetic field at the surface of the rock formation; and a processor configured to convert the measured component of the electromagnetic field measured at the electromagnetic receiver into an electromagnetic field response per unit moment of the electromagnetic source. The electromagnetic field response provides information about characteristics parameters of the fracture or fracture zone.

19 Claims, 5 Drawing Sheets

(56) References Cited

U.S. PATENT DOCUMENTS

| | | | |
|---|---|---|---|
| 2007/0256830 A1* | 11/2007 | Entov et al. | 166/250.1 |
| 2007/0265782 A1 | 11/2007 | Kleinberg et al. | |
| 2009/0001986 A1 | 1/2009 | Besson et al. | |
| 2009/0005993 A1* | 1/2009 | Abubakar | G01V 11/00 702/7 |
| 2009/0166030 A1* | 7/2009 | Zhuravlev | E21B 43/26 166/250.1 |
| 2009/0277630 A1* | 11/2009 | McDaniel et al. | 166/250.1 |
| 2010/0259267 A1* | 10/2010 | Rosthal | G01V 3/30 324/339 |
| 2012/0056627 A1* | 3/2012 | Troxler | G01N 33/42 324/601 |
| 2013/0176030 A1* | 7/2013 | Simon | 324/333 |
| 2014/0239957 A1* | 8/2014 | Zhang | G01V 3/30 324/334 |
| 2015/0168588 A1* | 6/2015 | Vinegar | G01V 3/06 702/7 |
| 2015/0204997 A1* | 7/2015 | Cuevas | G01V 3/30 324/338 |

* cited by examiner

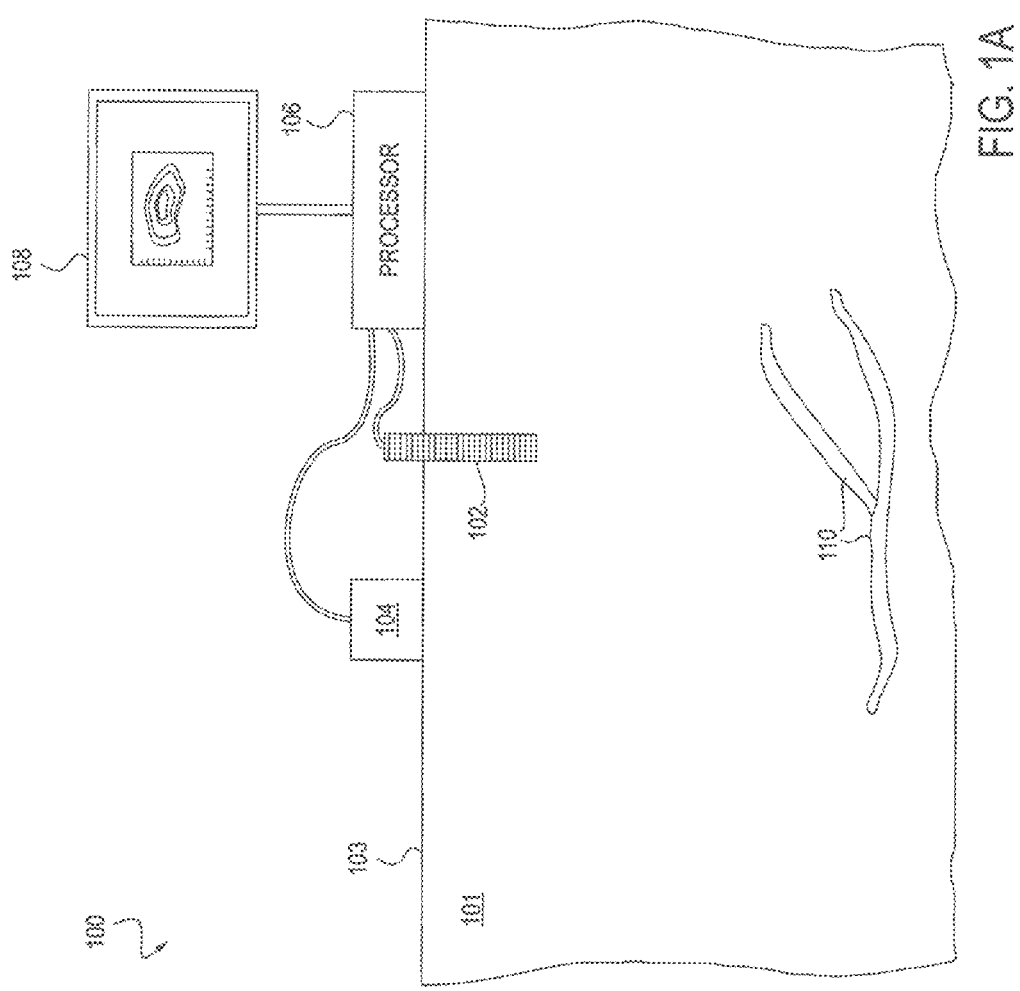

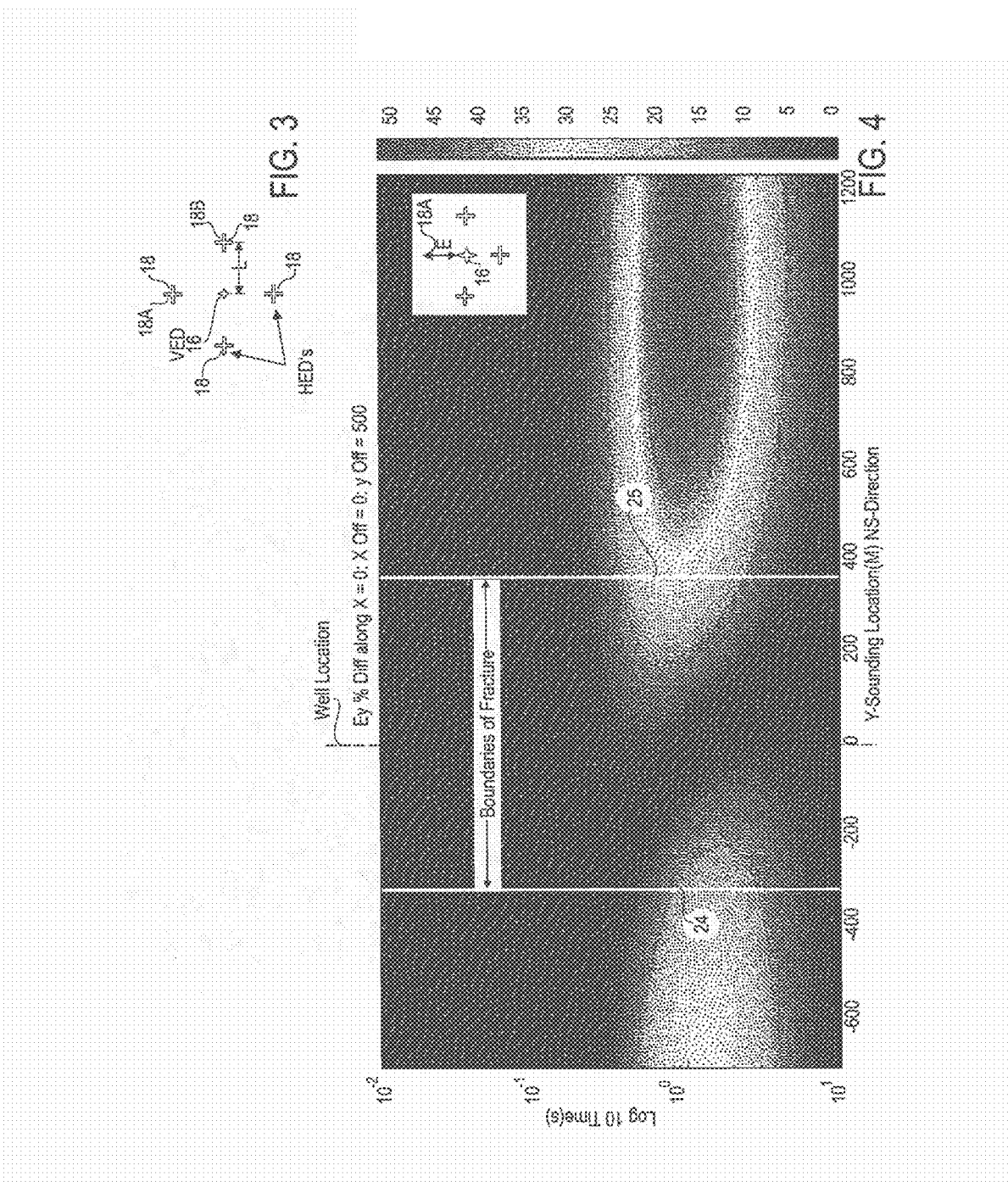

SYSTEM AND METHOD FOR DETECTING A FRACTURE IN A ROCK FORMATION USING AN ELECTROMAGNETIC SOURCE

FIELD

The present invention pertains to a system and method for detecting a fracture in a rock formation.

BACKGROUND

Hydraulic fracturing (hydro-frac) of hydrocarbon bearing formations is a production enhancing technique that is applied in conventional and unconventional hydrocarbon reservoirs worldwide. In reservoirs where hydro-fracturing (hydro-fracking) is used, the placement of wells is governed by the assumed volume of reservoir drained by each fracked or fractured zone. Inaccurate characterization of the size of the hydro-fractured zones leads to drilling more wells than necessary to efficiently drain a given reservoir. The ability to more accurately determine fracture zone dimensions can lead to efficiencies in well planning and drilling.

SUMMARY

An aspect of the present invention is to provide a surface electromagnetic (EM) survey system for detecting a fracture or fracture zone in a rock formation. The system includes an electromagnetic source configured to generate an electromagnetic field in the vicinity of or at the surface of the rock formation. The electromagnetic source includes one or more electric dipole sources that are arranged in the vicinity of the surface or at the surface so as to generate a substantially vertical electric field. For example, in one embodiment, the one or more electric dipole sources can be disposed vertically at a shallow depth from the surface within the rock formation. In another embodiment, a plurality (e.g., between 4 and 8) horizontal grounded electric dipoles can be oriented radially about a center point so as to produce the substantially vertical electric field beneath the center of the plurality of horizontal electrical dipoles in the subsurface. Either the electric dipole disposed vertically or the array of horizontal electric dipole sources will henceforth be referred to herein as a VED source. The system further includes an electromagnetic receiver associated with the electromagnetic source, the electromagnetic receiver being configured to measure a component of the electromagnetic field at the surface of the rock formation. The system also includes a processor configured to convert the measured component of the electromagnetic field measured at the electromagnetic receiver into an electromagnetic field response per unit moment of the electromagnetic source. The electromagnetic field response provides information about characteristics parameters of the fracture or fracture zone.

Another aspect of the present invention is to provide a method for detecting a fracture, or fracture zone in a rock formation using a surface electromagnetic (EM) survey system. The method includes generating, using an electromagnetic source, an electromagnetic field in the vicinity of or at the surface of the rock formation. The electromagnetic source includes one or more electric dipole sources that are arranged in the vicinity of the surface or at the surface so as to generate a substantially vertical electric field. For example, in one embodiment, the one or more electric dipole sources can be disposed vertically at a shallow depth from the surface within the rock formation. In another embodiment, a plurality (e.g., between 4 and 8) horizontal grounded electric dipoles can be oriented radially about a center point so as to produce the substantially vertical electric field beneath the center of the plurality of horizontal electrical dipoles in the subsurface. Either the electric dipole disposed vertically or the array of horizontal electric dipole sources will henceforth be referred to herein as a VED source. The method further includes measuring, using an electromagnetic receiver associated with the electromagnetic source, a component of the electromagnetic field at the surface of the rock formation; and converting, using a processor, the component of the electromagnetic field into an electromagnetic field response per unit moment of the electromagnetic source. The measured electromagnetic field response provides information about characteristics of the fracture or fracture zone.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1A depicts a surface electromagnetic (EM) survey system for detecting a fracture in a rock formation, according to an embodiment of the present invention;

FIG. 3 shows a star pattern of a vertical electric dipole (VED) source surrounded by horizontal electric dipole receivers, according to an embodiment of the present invention;

FIG. 4 is a three-dimensional representation of response percent change in the time domain, as a function of logarithm of time and location along the Y-axis (i.e., NS-direction) for the fracture zone shown in FIGS. 1B and 2, according to an embodiment of the present invention.

DETAILED DESCRIPTION

Figure 1B:
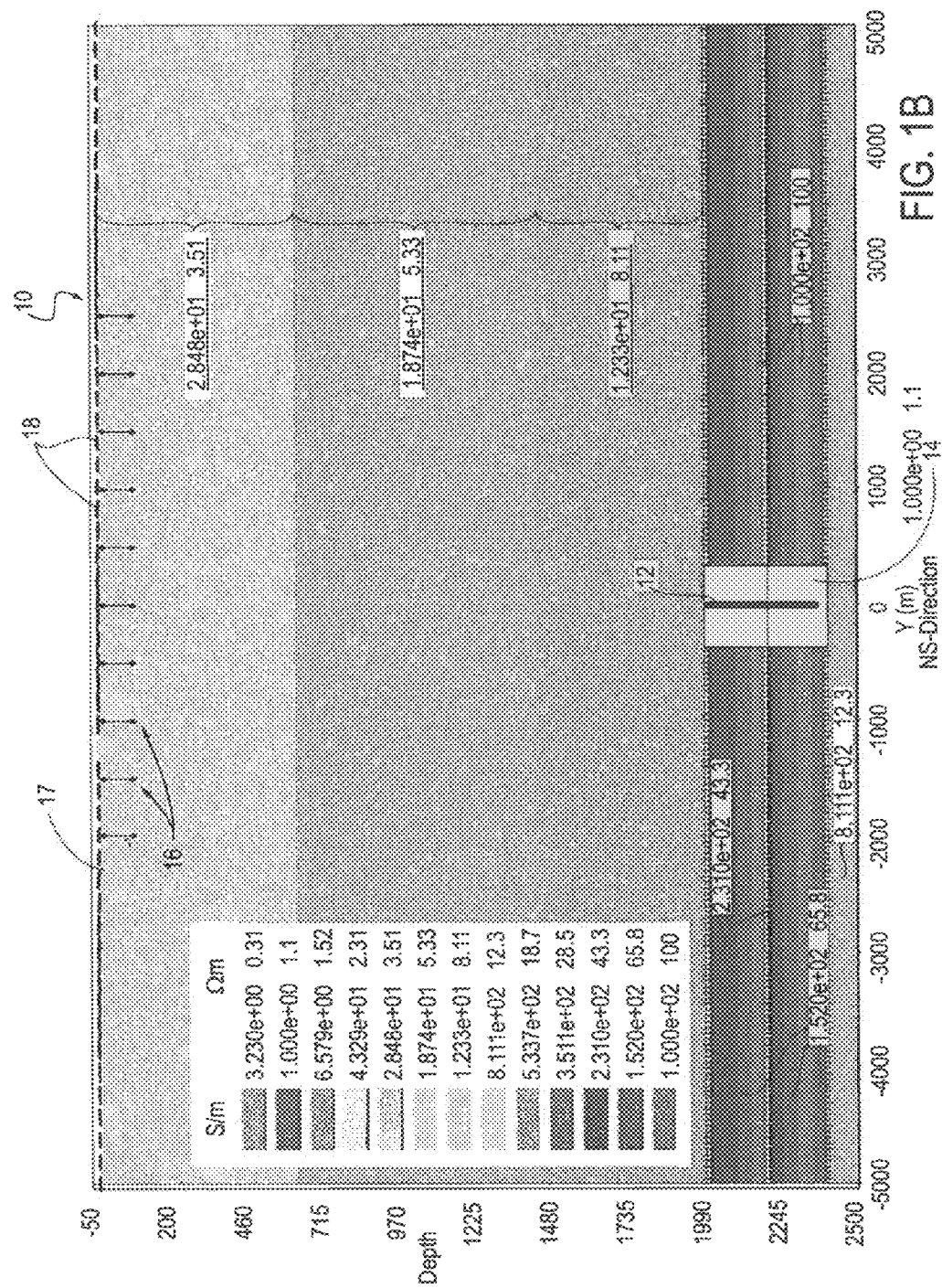
FIG. 1B is a cross-sectional view of a simulated North-South (NS) depth section including simulated well and simulated fracture zone, according to an embodiment of the present invention.

The system and method for detecting a fracture within a rock formation using a vertical electric dipole can improve the ability to map fracture zones from surface electromagnetic measurements.

FIG. 1A depicts a surface electromagnetic (EM) survey system 100 for detecting a fracture, or fracture zone 110 in a rock formation 101, according to an embodiment of the present invention. The system 100 includes an electromagnetic source 102 configured to generate an electromagnetic field in a vicinity of or at surface 103 of the rock formation 101. The electromagnetic source 102 may include one or more electric dipole sources that are arranged in the vicinity of the surface 103 so as to generate a substantially vertical electric field. For example, in one embodiment, the one or more electric dipole sources can be disposed vertically at a shallow depth from the surface within the rock formation. In another embodiment, a plurality (e.g., between 4 and 8) horizontal grounded electric dipoles can be oriented radially about a center point so as to produce the substantially vertical electric field beneath the center of the plurality of horizontal electrical dipoles in the subsurface. The system 100 further includes an electromagnetic receiver 104 associated with the electromagnetic source 102. The electromagnetic receiver 104 is configured to measure a component of the electromagnetic field at the surface 103 of the rock formation 101. The system 100 further includes a processor 106 in communication with the source 102 and the receiver 104. The processor 106 is configured to convert the measured component of the electromagnetic field measured at the electromagnetic receiver 104 into an electromagnetic field response per unit moment of the electromagnetic source 102. The electromagnetic field response provides information about characteristics or characteristics parameters of the fracture, or fracture zone 110. In one embodiment, the characteristics of the fracture may include an orientation of the fracture or fracture zone, a location of the fracture or fracture zone, a dimension of the fracture or fracture zone, or an extent of the fracture or fracture zone, or any combination thereof.

In one embodiment, the system 100 may further include a display system 108 in communication with the processor 106 to display or provide a visual representation of the electromagnetic field response.

In one embodiment, the electromagnetic source 102 may include one or more electric dipole sources. In one embodiment, the electromagnetic receiver 104 may include one or more electric or magnetic field receivers. In the following paragraphs, the above system 100 will be further described in connection to a simulated system or simulated data response. However, as it can be appreciated, the above system 100 can be implemented in a real field measurement.

FIG. 1B is a cross-sectional view of a simulated North-South (NS) depth section 10 including simulated well 12 and simulated fracture zone 14, according to an embodiment of the present invention. The vertical axis (or z-axis) of section 10 represents the depth. The horizontal axis (y-axis) of section 10 represents the distance along the NS direction of the depth section 10. In this example, the simulated well 12 is located at the distance 0 on the y-axis and at a depth between approximately 1990 meters and approximately 2590 meters. Simulated electromagnetic sources including vertical electric dipoles (VED) 16 and receivers including horizontal electric dipoles (HED) 18 are disposed at or near the surface 17. In this embodiment, a plurality of electric dipole sources 16 dipole sources are shown disposed vertically at a shallow depth from the surface within the rock formation. However, as stated in the above paragraphs, in another embodiment, a plurality (e.g., between 4 and 8) horizontal grounded electric dipoles can be oriented radially about a center point so as to produce a predominantly or substantially vertical electric field beneath the center of the plurality of horizontal electrical dipoles in the subsurface. Either the electric dipoles 16 disposed vertically or the array of horizontal electric dipole sources are considered herein as VED sources as both produce vertically oriented electrical fields.

This system is designated as a VED-HED system. In this embodiment, the VED sources 16 are disposed near the surface 17, for example, within drilled holes at a shallow depth (e.g., between approximately 100 m and approximately 200 m on the z-axis). The term "shallow depth" is a relative term that is used to indicate that the depth of the drilled holes is smaller than the depth location of the fracture which is in the range of 1500 meters to 3000 meters or greater. The HED receivers 18 are disposed on the surface 17 (e.g., at 0 m on the z-axis). The HED surface receivers 18 can be commercial multi-transient electromagnetic (MTEM) receivers or any type of commercial electromagnetic (EM) receivers used in hydrocarbon or mining exploration applications.

Figure 2:
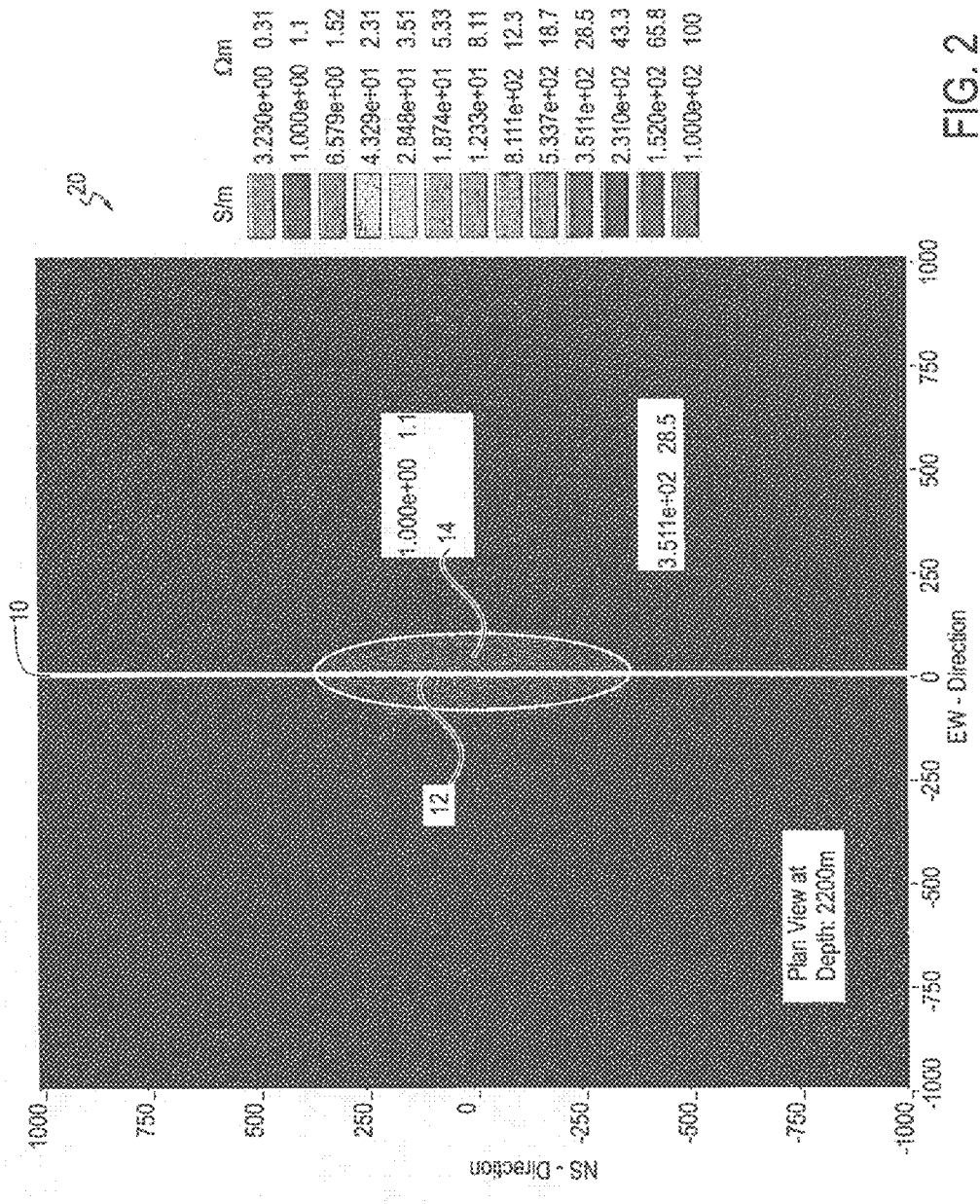
FIG. 2 shows a cross-sectional view of a simulated depth section at the depth where the fracture is located, according to an embodiment of the present invention.

FIG. 2 shows a cross-sectional view of a simulated depth section 20 at the depth where the fracture is located (e.g., at about 2200 meters), according to an embodiment of the present invention. The vertical axis (y-axis) of the depth section 20 represents the distance along the NS direction of the depth section 20. The horizontal axis (x-axis) of the depth section 20 represents the distance along the east-west (EW) direction of the depth section 20. The NS depth section 10 is represented in this as a line 10. The simulated well 12 is also represented in FIG. 2. The simulated fracture zone 14 is also shown in depth section 20 delimited by an elliptical shape. The simulated fracture zone 14 is approximated by an elliptical region having a length of about 740 meters.

In one embodiment, the fracture zone 14 can be created by injecting through a well a conductive fluid into the rock formation that increases the electrical conductivity of the fractured rock formation by displacing less conductive fluids that naturally exist in the pores and cracks and fractures within the rock formation. The anisotropic electrical conductivity of a volume of rock with a given fracture density in X, Y and Z directions can be calculated using an equivalent media theory, one example of such a theory has been developed by Berryman and Hoversten.

In order to locate and determine fracture zone properties as the properties change after fracturing a rock formation (e.g., hydro-fracking the rock formation), a relatively large response has to be produced by the changes. In order to carry enough information for location and discrimination via any inverse imaging approach, the measured response has to be larger than any other noise sources in the measured response. Although, the term "hydro-fracturing" or "hydro-fracking" is used herein, the fracturing is not limited to only hydro-fracturing. Indeed, any type of fracturing mechanism can be used to create or generate a fracture within a rock formation including, but not limited to, hydro-fracturing, fluid-fracturing, vibration fracturing, explosive fracturing, etc.

In one embodiment, the responses of the HED receivers 18 are simulated by calculating the HED responses from the VED sources 16 as a function of time after turning off a step function in transmitters energizing the VED sources 16. Two calculations are performed. A first response R1 of the system VED-HED to an unperturbed background before fracturing (e.g., hydro-fracking), where no fracture zone is present, is calculated. Then, a second response R2 with the presence of the fracture zone after fracturing (e.g., hydro-fracking), as shown in FIGS. 1 and 2, is determined. The two responses (the first and the second responses) are then differenced (R2−R1) and a percent change (C) can be calculated as a function of space and time, for example, using the equation (1).

$$C = \left(\frac{R2 - R1}{R1}\right) * 100 \quad (1)$$

FIG. 3 shows a star pattern of VED source 16 surrounded by HED receivers 18, according to an embodiment of the present invention. Both North-South (NS) and East-West (EW) oriented electrical fields E are measured at each HED receiver 18. Although electrical fields E are described as being measured in this example, as it can be appreciated, magnetic fields B can be measured instead.

In this example, the VED sources 16 and HED receivers 18 are arranged in a "star" configuration as shown in FIG. 3 where four HED receivers 18 associated with one VED source 16 are used. However, as it can be appreciated, there are many possible combinations of VED source 16 and HED receiver 18 configurations that can be employed. For example, one VED source can be used in conjunction with one, two or more HED receivers 18. A desired configuration can be selected depending on backgrounds and depths to the fracture zones. As shown in FIG. 3, the VED source 16 and the HED receivers 18 are spaced apart from each other by a distance "L". In the present example, the distance L separating the HED receivers 18 and the VED source 16 is approximately 100 meters. In one embodiment, the star pattern VED source 16 and HED receivers 18 is positioned at regular intervals (e.g., 50 meters) along the North-South (NS) line along the y-axis direction shown in FIG. 2, from −1000 meters to +1000 meters. Each HED source 16 is 100 m long.

In one embodiment, the second response (R2) from the NS oriented couple VED source 16—HED receiver 18A (HED receiver 18A being ahead of the VED source 16 in the positive direction perpendicular to the y-axis) is differenced from pre-fracturing (e.g., pre-hydro-frac) first response (R1) to produce a percent-difference change (C). In this embodiment, the HED receiver 18A is at a different y-location than the VED source 16. The receiver-source (i.e., VED source 16 and HED receiver 18) are both in the NS-line 10 along which they are moved. The results can be plotted as contours of percent change (C) as a function of EW position and time after turn off of the transmitter.

FIG. 4 is a contour plot of the response percent change (C) in the time domain, as a function of logarithm of time and location along the Y-axis (i.e., NS-direction) for the fracture zone shown in FIGS. 1B and 2, according to an embodiment of the present invention. In this embodiment, the orientation of the electric field received by the HED receiver 18A relative to the VED source 16 and the HED receiver 18A is along the NS-direction and is shown in inset box in FIG. 4. As can be noted in FIG. 4, the maximum percent change (C) in the electric field response is over 50% for the fracture zone 14 at about 2000 meters below the surface. In addition, a lateral extent of the fracture zone 14 is delimited by the two vertical lines 24 and 25.

As shown in FIG. 4, for the configuration where the HED receiver 18A that receives the electrical signal leads the VED source 16 along the NS-direction (see the box insert within FIG. 4), the percent change (C) is asymmetric about the fracture zone location or well location. In addition, the percent change shows a minimum at around the well location. The maximum response percent change occurs at around 1000 meters in the NS-direction. Furthermore, as can be noted from FIG. 4, the maximum response percent change occurs at a time of approximately one second after turning off the transmitter, i.e., turning off the VED source 16.

In another embodiment, the second response (R2) from the EW-oriented couple VED source 16—HED receiver 18B (the HED receiver 18B being ahead of the VED 16 in the positive direction along the EW-direction) is differenced from pre-fracturing (e.g., pre-hydro-frac) first response (R1) to produce a percent-difference change (C). In this embodiment, the HED receiver 18B is at the same Y-location as the VED source 16. The whole array source-receiver moves along the line 10 in the NS-direction. In this embodiment, EW-oriented electric field at the HED positions 18B just to the East of the VED source 16 is used (the receiver 18 and source 16 are disposed in a line that is substantially perpendicular to the NS-direction or line 10 along which the receiver and source are moved). The results can also be plotted as contours of percent change (C) as a function of North-South position along the NS-direction and time after turn off of the transmitter.

Figure 5:
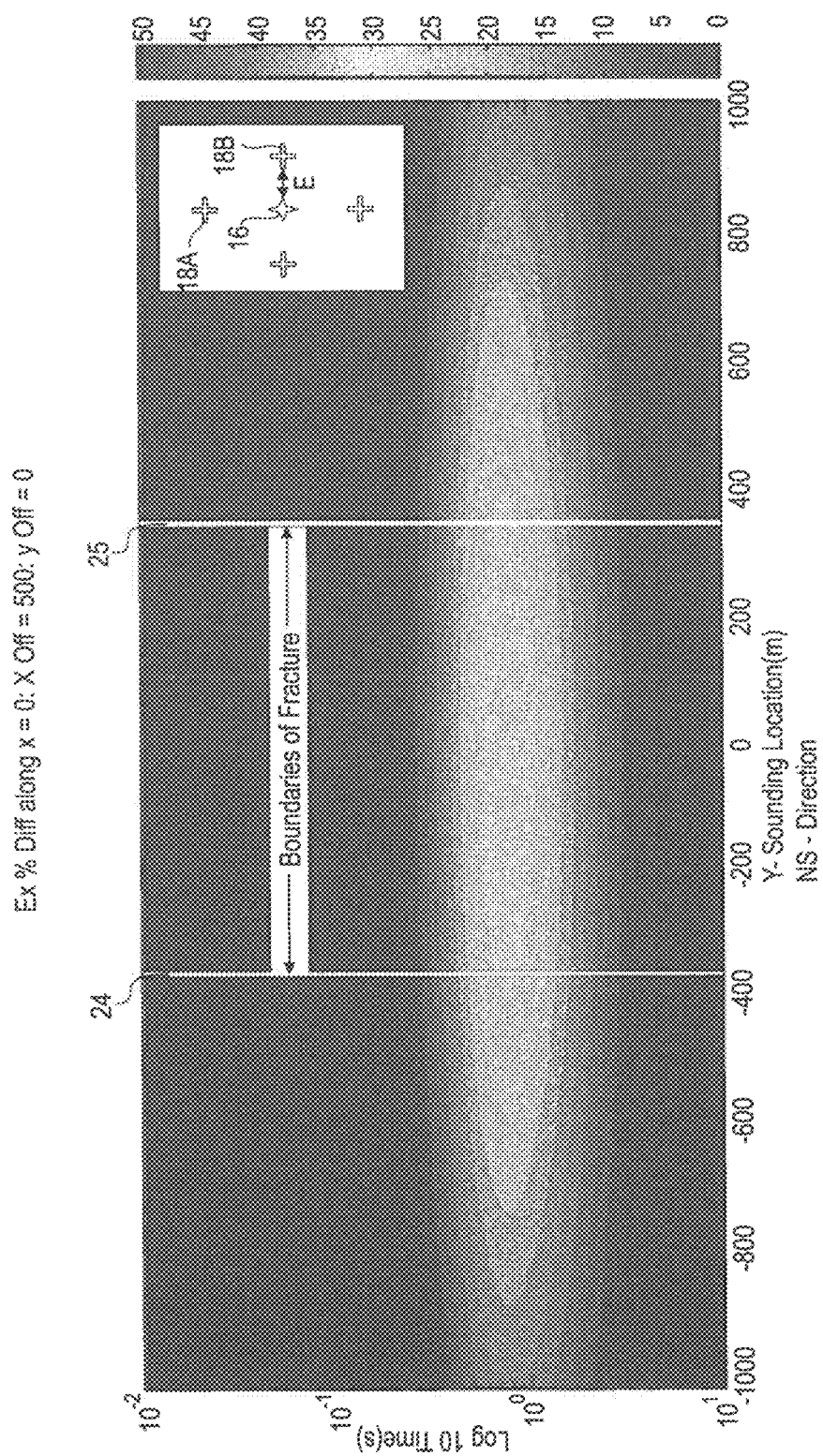
FIG. 5 is a three-dimensional representation of the response percent change (C) in the time domain, as a function of logarithm of time and location along the Y-axis (i.e., NS-direction) for the fracture zone shown in FIGS. 1B and 2, according to another embodiment of the present invention.

FIG. 5 is a contour plot of the response percent change (C) in the time domain, as a function of logarithm of time and location along the Y-axis (i.e., NS-direction) for the fracture zone shown in FIGS. 1B and 2, according to another embodiment of the present invention. In this embodiment, the orientation of the electric field received by the HED receiver 18B relative to the VED source 16 and the HED receiver 18A is shown in inset box in FIG. 5. A lateral extent of the fracture zone 14 is delimited by the two vertical lines 24 and 25.

In this case, since the source-receiver configuration (i.e., HED 18B and VED 16 configuration) is symmetric with respect to the geometry of the fracture zone 14, the percent change electric response is also symmetric. In this case, the EW-oriented electric field E is not maximally coupled to the long axis of the fracture zone 14 as is the case for the configuration shown in FIG. 4. As a result, the maximum change response is lower. However, approximately 25% response change can be detected due to the fracture zone being relatively large.

In the above examples, the percent response change is captured in the time domain where the amplitude and time are plotted (see, FIGS. 4 and 5) and analyzed. However, the percent response change can also be captured in the frequency domain where the amplitude a phase can be plotted. The presence of a fracture can be detected and measured by using the information provided by the percent response change in the frequency domain.

The changes in the response shown in the above examples are large compared to expected noise levels during field acquisition. Therefore, the electromagnetic measurement system described herein has great potential for monitoring fracture zones. The percent response change alone can provide information about the spatial orientation of the fractures, location of the fractures, dimension of the fractures, extent of the fractures, or any combination thereof. In addition, it is expected that through inversion of the acquired electric data information collected by the receivers 18, the electrical conductivity of the fracture zones can also be quantified. The fracture extent and densities can be estimated from the fracture zone electrical properties. Furthermore, because these measurements can be made from the surface, these measurements represent a new monitoring capability with significant cost savings when compared to any measurement technique that requires access to wells.

As it can be appreciated from the above paragraphs there is also provided a method for detecting a fracture in a rock formation using a surface electromagnetic (EM) survey system. The method includes generating, using an electromagnetic source (e.g., source 102, 16), an electromagnetic field in a vicinity or at a surface of the rock formation; measuring, using an electromagnetic receiver (e.g., receiver 104, 18)

associated with the electromagnetic source (102, 16), a component of the electromagnetic field at the surface of the rock formation; and converting, using a processor (e.g., processor 106), the measured component of the electromagnetic field measured at the electromagnetic receiver into an electromagnetic field response per unit moment of the electromagnetic source, wherein the electromagnetic field response provides information about characteristics data of the fracture or fracture zone. In one embodiment, the characteristics data may include an orientation of the fracture or fracture zone, a location of the fracture or fracture zone, a dimension of the fracture or fracture zone, or an extent of the fracture or fracture zone, or any combination thereof.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A surface electromagnetic (EM) survey system for detecting a fracture or fracture zone in a rock formation, the system comprising:
    an electromagnetic source configured to generate an electromagnetic field in a vicinity of an earth surface or at the earth surface, wherein the electromagnetic source includes one or more electric dipole sources that are arranged in the vicinity of the earth surface or at the earth surface;
    an electromagnetic receiver associated with the electromagnetic source, the electromagnetic receiver being configured to measure a component of the electromagnetic field at the earth surface, wherein the electromagnetic receiver is configured to measure the component of the electromagnetic field before fracturing the rock formation to obtain a first electromagnetic response, and to measure the component of the electromagnetic field after fracturing the rock formation to obtain a second electromagnetic response; and
    a processor configured to convert the measured component of the electromagnetic field measured at the electromagnetic receiver into an electromagnetic field response per unit moment of the electromagnetic source, wherein the electromagnetic field response provides information about characteristics parameters of the fracture or fracture zone.

2. The system according to claim 1, wherein the one or more electric dipole sources are disposed vertically at a shallow depth from the earth surface.

3. The system according to claim 1, wherein the electromagnetic source includes a plurality of electric dipole sources disposed horizontally and oriented radially about a center point so as to produce a substantially vertical electric field beneath the center point.

4. The system according to claim 1, wherein the characteristics parameters of the fracture or fracture zone include an orientation of the fracture or fracture zone, a location of the fracture or fracture zone, a dimension of the fracture or fracture zone, or an extent of the fracture or fracture zone, or any combination thereof.

5. The system according to claim 1, wherein the electromagnetic receiver includes one or more electric or magnetic field receivers that are configured to measure in a time domain or in a frequency domain.

6. The system according to claim 1, wherein fracturing the rock formation includes injecting a conductive fluid into the rock formation to increase an electrical conductivity of the rock formation by displacing less conductive fluids that naturally exist within the rock formation.

7. The system according to claim 1, wherein the processor is configured to compute a percent change from the first and second electromagnetic responses.

8. The system according to claim 7, wherein the electromagnetic source and the electromagnetic receiver are disposed within a line along which the electromagnetic source and the electromagnetic receiver are moved, wherein the component of the electromagnetic field received by the electromagnetic receiver is along the line.

9. The system according to claim 7, wherein the electromagnetic source and the electromagnetic receiver are disposed in a line that is substantially perpendicular to a line along which the electromagnetic source and the electromagnetic receiver are moved.

10. The system according to claim 1, wherein the electromagnetic field response provides information about fracture zone geometry including orientation, extent, or density, or any combination thereof.

11. A method for detecting a fracture or fracture zone in a rock formation using a surface electromagnetic (EM) survey system, the method comprising:
    generating, using an electromagnetic source, an electromagnetic field in a vicinity of an earth surface or at the earth surface, the electromagnetic source includes one or more electric dipole sources that are arranged in the vicinity of the earth surface or at the earth surface;

measuring, using an electromagnetic receiver associated with the electromagnetic source, a component of the electromagnetic field at the earth surface, wherein the measuring comprises measuring, by the electromagnetic receiver, the component of the electromagnetic field before fracturing the rock formation to obtain a first electromagnetic response, and measuring the component of the electromagnetic field after fracturing the rock formation to obtain a second electromagnetic response; and converting, using a processor, the measured component of the electromagnetic field measured at the electromagnetic receiver into an electromagnetic field response per unit moment of the electromagnetic source, wherein the electromagnetic field response provides information about characteristics parameters of the fracture.

12. The method according to claim 11, wherein generating the electromagnetic field using the electromagnetic source comprises generating a substantially vertical electric field using one or more electric dipole sources that are disposed vertically at a shallow depth from the earth surface.

13. The method according to claim 11, wherein generating the electromagnetic field using the electromagnetic source comprises generating a substantially vertical electric field using a plurality of electric dipole sources disposed horizontally and oriented radially about a center point so as to produce the substantially vertical electric field beneath the center point.

14. The method according to claim 11, wherein the characteristics parameters of the fracture or fracture zone include an orientation of the fracture or fracture zone, a location of the fracture or fracture zone, a dimension of the fracture or fracture zone, or an extent of the fracture or fracture zone, or any combination thereof.

15. The method according to claim 11, further comprising fracturing the rock formation by injecting a conductive fluid into the rock formation to increase an electrical conductivity of the rock formation by displacing less conductive fluids that naturally exist in pores, cracks and fractures within the rock formation.

16. The method according to claim 11, further comprising computing, by the processor, a percent change from the first and second electromagnetic responses.

17. The method according to claim 16, disposing the electromagnetic source and the electromagnetic receiver within a line along which the electromagnetic source and the electromagnetic receiver are moved, the component of the electromagnetic field received by the electromagnetic receiver is along the line.

18. The method according to claim 16, further comprising disposing the electromagnetic source and the electromagnetic receiver in a line substantially perpendicular to a line along which the electromagnetic source and the electromagnetic receiver are moved.

19. The method according to claim 11, further comprising providing information about fracture zone geometry including orientation, extent, or density, or any combination thereof.

* * * * *